UNITED STATES PATENT OFFICE.

WILLIAM EDWIN HARRIS, OF NILES, OHIO.

PAINT.

SPECIFICATION forming part of Letters Patent No. 649,930, dated May 22, 1900.

Application filed January 16, 1899. Serial No. 702,326. (No specimens.)

*To all whom it may concern:*

Be it known that I, WILLIAM EDWIN HARRIS, a resident of Niles, in the county of Trumbull and State of Ohio, have invented a new and useful Improvement in Paints; and I do hereby declare the following to be a full, clear, and exact description thereof.

My invention relates to the utilization of waste palm-oil.

In the manufacture of tin-plate the plates to be tinned are put into a pot made for the purpose that holds about one (1) ton, more or less, of molten tin. Palm-oil is put on top of the molten tin, and the plates are then drawn one by one through the tin and oil, the oil keeping the tin from forming in lumps on the plates. After the palm-oil has been used in this way for some time it becomes dark in color, thick, tar-like, and partially carbonized. It must then be removed and a fresh supply put on. Heretofore this waste or refuse palm-oil has been thrown aside as having no commercial value.

The object of my invention is to utilize this waste product; and the invention consists in the utilization of it in the manufacture of paint.

In practice I take the waste or refuse palm-oil in the thick, tar-like, and partially-carbonized state in which it is taken from the tinning-pots and mix it with ordinary rosin, slaked lime, and a suitable drier in about the following proportions: twenty (20) pounds of ordinary rosin, five (5) pounds of slaked lime, and fifty (50) gallons of refuse or waste palm-oil. To this mixture a suitable quantity of drier is added. The above ingredients are then boiled in a suitable vessel. The resultant product is a paint which I have found to be applicable to iron or wooden structures. It has proved to be very durable and possessed of great lasting qualities where exposed to the influences of all kinds of weather.

The above proportions may of course be varied, and I do not wish, furthermore, to limit myself to the exact ingredients above mentioned, but wish to claim, broadly, the utilization of waste or refuse palm-oil as an ingredient of paint.

In drawing the plates out of the molten tin through the palm-oil the latter becomes partially burned by the heat of the molten tin and to some extent is broken down, forming, probably, a considerable amount of carbon, which gives to the refuse or waste oil its dark appearance. At any rate the oil becomes much darker, thick, and tar-like, and possesses qualities which make it desirable for use in paints.

I am aware that it has been proposed to employ palm-oil in its normal state and a gummy residuum of palm-oil as an ingredient of coating or painting compositions, and I make no claim to a composition having such ingredients.

The use of partially-burned palm-oil as an ingredient of a paint compound I believe to be original with me, and I have found it to possess qualities that render it more desirable than oil in an unoxidized condition.

My composition has been found to be of great value as a roofing-paint, and inasmuch as the more inflammable constituents have been mainly, if not wholly, removed from the principal ingredient the paint is not readily ignitible.

What I claim as my invention, and desire to secure by Letters Patent, is—

1. As a new composition of matter, a paint, the principal ingredient of which is tar-like waste palm-oil out of which the more inflammable constituents have been burned.

2. A composition of matter for use as a paint, comprising a mixture of partially-burned palm-oil, ordinary rosin and slaked lime in about the proportions specified.

3. A composition of matter for use as a paint, consisting of a mixture of partially-burned palm-oil, rosin and slaked lime in about the proportions specified, and a drier.

In testimony whereof I, the said WILLIAM EDWIN HARRIS, have hereunto set my hand.

WILLIAM EDWIN HARRIS.

Witnesses:
    JEREMIAH F. MORRIS,
    ROBERT MCCARTY.